(12) United States Patent
Kaneko

(10) Patent No.: US 6,413,035 B1
(45) Date of Patent: Jul. 2, 2002

(54) SHEET WORKING SYSTEM

(75) Inventor: Shou Kaneko, Kanagawa (JP)

(73) Assignee: Amada Company, Limited, Kanagawa (JP)

(*) Notice: Subject to any disclaimer, the term of this patent is extended or adjusted under 35 U.S.C. 154(b) by 0 days.

(21) Appl. No.: 09/530,585

(22) PCT Filed: Jan. 11, 2000

(86) PCT No.: PCT/JP00/00069

§ 371 (c)(1),
(2), (4) Date: May 5, 2000

(87) PCT Pub. No.: WO00/41848

PCT Pub. Date: Jul. 20, 2000

(30) Foreign Application Priority Data

Jan. 11, 1999 (JP) .................................. 11-4501
Jan. 5, 2000 (JP) .............................. 2000-338

(51) Int. Cl.[7] ........................... B65G 59/02; G65H 3/00
(52) U.S. Cl. ........................ 414/796.9; 414/222.07; 414/225.01; 414/286; 414/788.7
(58) Field of Search ........................ 414/225.01, 286, 414/416.08, 788.7, 935, 796.9, 222.07

(56) References Cited

U.S. PATENT DOCUMENTS

| | | |
|---|---|---|
| 3,244,446 A | 4/1966 | Bopp |
| 3,516,653 A | 6/1970 | Bland |
| 3,653,525 A | 4/1972 | Merkner et al. |
| 3,761,675 A | 9/1973 | Mason et al. |
| 3,769,488 A | 10/1973 | Hasslinger |
| 3,912,253 A | 10/1975 | Jarman |
| 4,081,085 A | 3/1978 | Haenni |
| 4,162,641 A | 7/1979 | Stubbings |
| 4,189,270 A | 2/1980 | Ehrlich |
| 4,243,166 A | 1/1981 | Vossen et al. |
| 4,300,420 A | 11/1981 | Haenni |
| 4,361,062 A | 11/1982 | Reiff |
| 4,382,395 A | 5/1983 | Haar |

(List continued on next page.)

FOREIGN PATENT DOCUMENTS

| | | |
|---|---|---|
| EP | 0165871 | 12/1985 |
| EP | 0215389 | 3/1987 |
| EP | 0273414 | 7/1988 |
| EP | 0372786 | 3/1990 |
| EP | 0527114 | 2/1993 |
| EP | 0622152 | 11/1994 |
| EP | 0673711 | 9/1995 |
| FR | 2704471 | 11/1994 |
| GB | 2025927 | 1/1980 |
| GB | 2143199 | 2/1985 |
| JP | 56-64936 | 5/1981 |
| JP | 57-81028 | 5/1982 |

(List continued on next page.)

OTHER PUBLICATIONS

English Language Abstract of FR 2 704 471.
English Language Abstract of JP 63–278694.
English Language Abstract of JP 63–268591.
English Language Abstract of JP 62–292293.
English Language Abstract of JP 58–93528.

(List continued on next page.)

Primary Examiner—Christopher P. Ellis
Assistant Examiner—Gene O. Crawford
(74) Attorney, Agent, or Firm—Greenblum & Bernstein, P.L.C.

(57) ABSTRACT

Sheet metal working system includes a housing rack provided with a plurality of shelves for housing pallets, an elevator provided on a side of the housing rack, and a pallet holder located on a bottom shelf of the housing rack for temporarily holding a pallet transported by pallet transporter. Also provided is a workpiece separator located above the pallet holder, a workpiece table located adjacently to the housing rack, a sheet working machine and a workpiece piler arranged so as to sandwich the workpiece table, and a loader that moves among the workpiece table, the machine and the workpiece piler.

18 Claims, 9 Drawing Sheets

U.S. PATENT DOCUMENTS

| | | | |
|---|---|---|---|
| 4,509,891 A | 4/1985 | Lipscomb |
| 4,600,349 A | 7/1986 | Vogt |
| 4,638,144 A | 1/1987 | Latta, Jr. |
| 4,690,021 A | 9/1987 | Clark |
| 4,691,817 A | 9/1987 | Haar |
| 4,709,605 A | 12/1987 | Clark |
| 4,753,103 A | 6/1988 | Braun |
| 4,760,671 A | 8/1988 | Ward |
| 4,762,218 A | 8/1988 | Sticht |
| 4,768,913 A | 9/1988 | Baba |
| 4,775,277 A | 10/1988 | Zeleny |
| 4,806,071 A | 2/1989 | Sartorio |
| 4,825,032 A | 4/1989 | Duncan |
| 4,842,473 A | 6/1989 | Zbornik |
| 4,844,680 A | 7/1989 | Kawata et al. |
| 4,941,793 A | 7/1990 | Shiraishi et al. |
| 4,971,515 A | 11/1990 | Pol et al. |
| 4,975,018 A | 12/1990 | Langenbacher et al. |
| 4,993,937 A | 2/1991 | Ginnasi |
| 5,002,108 A | 3/1991 | Jenkner |
| 5,002,448 A | 3/1991 | Kamijima et al. |
| 5,030,055 A | 7/1991 | Parks et al. |
| 5,049,030 A | 9/1991 | Lockert |
| 5,064,991 A | 11/1991 | Alborante |
| 5,120,178 A | 6/1992 | Ito |
| 5,185,510 A | 2/1993 | Zumstein |
| 5,192,848 A | 3/1993 | Miyakawa et al. |
| 5,193,967 A | 3/1993 | Sartorio |
| 5,358,375 A | 10/1994 | Kawada et al. |
| 5,359,175 A | 10/1994 | Miyagawa et al. |
| 5,481,083 A | 1/1996 | Smyth, Jr. |
| 5,536,137 A | 7/1996 | Jäger |
| 5,941,673 A | 8/1999 | Hayakawa et al. |

FOREIGN PATENT DOCUMENTS

| | | |
|---|---|---|
| JP | 58-28741 | 2/1983 |
| JP | 58-93528 | 6/1983 |
| JP | 60-20332 | 2/1985 |
| JP | 60-30147 | 2/1985 |
| JP | 60-94388 | 5/1985 |
| JP | 60240341 | 11/1985 |
| JP | 60247422 | 12/1985 |
| JP | 60258024 | 12/1985 |
| JP | 61192458 | 8/1986 |
| JP | 61206709 | 9/1986 |
| JP | 61-54492 | 11/1986 |
| JP | 61277519 | 12/1986 |
| JP | 62-35531 | 2/1987 |
| JP | 62292293 | 12/1987 |
| JP | 63268591 | 11/1988 |
| JP | 63278694 | 11/1988 |
| JP | 3-196947 | 8/1991 |
| JP | 2519110 | 9/1996 |
| WO | 94/16858 | 8/1994 |
| WO | 98/42478 | 10/1998 |

OTHER PUBLICATIONS

English Language Abstract of JP 62–35531.
English Language Abstract of JP 60–94388.
English Language Abstract of EP 0 165 871.
English Language Abstract of JP 3–196947.
English Language Abstract of JP 60–258024.
English Language Abstract of JP 57–81028.
A *Sheet Metal CAD/CAM line system combining a Turret Punch Press and a Laser Processing Machine*, Press Technology, May 1987, pp. 69–75, along with a partial English translation.
English Language Abstract of JP 2519110.
English Language Abstract of JP 61–277519.
English Language Abstract of JP 60–240341.
English Language Abstract of JP 61–192458.
English Language Abstract of JP 60–247422.
English Language Abstract of JP 57–81028.
English Language Abstract of JP 61–206709.
English Language Abstract of JP 60–30147.
English Language Abstract of JP 60–20332.
English Language Abstract of JP 58–28741.
"Flexibel Automatisierte Fertigung Ebener Blechteile In Kleinen Stückzahlen", by Benzinger, Werkstatt Und Betrieb, vol. 117, No. 10, Oct., 1984, pp. 641–646.
"Flexible Fabrication Software Nests Parts to Schedule", Tooling and Production vol. 51, No. 5, Aug., 1985, p. 87.

SHEET WORKING SYSTEM

TECHNICAL FIELD

The present invention relates to a sheet working system for performing sheet metal working on a workpiece by means of a sheet metal working machine.

BACKGROUND ART

Conventionally, a laser working system 101 as a sheet metal working system includes, as shown in FIGS. 1 and 2, a housing rack 105, which has a plurality of shelves 103, for housing pallets P on which workpieces W are placed in a vertical direction. An elevator 107 for taking the pallets P in/out of the shelves 103 and moving up/down the pallets P, is provided on a side of the housing rack 105 (on the left side in FIGS. 1 and 2).

A workpiece separator apparatus 109 is arranged so as to be adjacent to the housing rack 105, and a laser working machine 111 and a plurality of carry-out/piling apparatuses 113 are arranged in this order on a right side of the workpiece separator apparatus 109 in FIGS. 1 and 2. Furthermore, a guide rail 117 for moving the workpiece separator apparatus 109 and a carry-out unloader 115 in a horizontal direction in FIG. 1 and in a vertical direction in FIG. 2 is provided.

According to the above structure, a pallet P selected from the pallets P housed on the plural shelves 103 of the housing rack 105 is pulled out into the elevator 107. Next, the elevator 107 is lowered so as to be stopped in a bottom shelf of the housing rack 105. The pallet P on which the workpieces W are placed is transferred from the elevator 107 stopped in the bottom shelf of the housing rack 105 onto a pallet table 119 which is capable of moving up/down. The pallet table 119 is provided below the workpiece separator apparatus 109.

When an upper-most workpiece W on the pallet P on the pallet table 119 is taken by the workpiece separator apparatus 109, the workpiece separator apparatus 109 is guided along the guide rail 117 so as to be transported to the laser working machine 111, and the workpiece W is transferred onto a working table of the laser working machine 111. Then, the workpiece W is laser-worked by the laser working machine 111. The laser-worked workpiece W is transported above a piling table 121 by the carry-out unloader 115 so as to be carried out onto the collecting table 121.

In the above-mentioned conventional laser working system 101, since a portion which is represented by slanted lines in FIG. 2 is a useless space. Furthermore, since the carry-in/out apparatuses 119 and 113 are located on the right and left sides of the laser working machine 111 in FIGS. 1 and 2, there arises a problem such that operability is not satisfactory when a number of lots is small and when a workpiece W is carried in/out by an operator without the carry-in/out apparatuses 119 and 113 (off-line operation).

DISCLOSURE OF THE INVENTION

It is an object of the present invention to provide a sheet working system which reduces an installation space and improves operability at the time of off-line operation.

In order to achieve the above object, a sheet working system according to the present invention comprises: a housing rack provided with a plurality of shelves in its vertical direction for housing pallets on which workpieces are placed; a pallet transport means provided on a side of the housing rack, the pallet transport means being capable of moving up/down, the pallet transport means having a traverser for putting the pallets into/out of the housing rack; a pallet holding means located on a bottom shelf of the housing rack, the pallet holding means temporarily holding a pallet transported by the pallet transport means; a workpiece separator means located above the pallet holding means, the workpiece separator means taking a single workpiece; a workpiece table means located adjacently to the housing rack, the workpiece table means being capable of moving, the workpiece table means temporarily placing the single workpiece taken by the workpiece separator means; a sheet working machine and a workpiece piling means arranged so as to sandwich the workpiece table means; and an loading/unloading means being capable of moving among the workpiece table means, the sheet working machine and the workpiece piling means.

Therefore, the pallets on which the workpieces are placed are housed on the plurality of shelves of the housing rack. After the pallet which is selected from the pallets on the plurality of shelves is pulled out by the traverser provided to the pallet transporting means, the pallet transport means is lowered so that the pallet is transported into the bottom of the housing rack. The transported pallet is temporarily held by the pallet holding means provided on the bottom shelf of the housing rack.

In the state that an upper-most workpiece of the workpieces on the pallet temporarily held by the pallet holding means is lifted up by the workpiece separator means, the workpiece table means is moved from the side of the housing rack to a position below the workpiece separator means so as to be stopped. After the workpiece is unloaded from the workpiece separator means and placed onto the workpiece table means, the workpiece table means is moved to the side of the housing rack.

In this state, the workpiece on the workpiece table means is held by the loading/unloading means which waits in the side position of the pallet transport means, and the loading/unloading means is moved to the sheet working machine, then the workpiece is placed onto a specified position of the sheet working machine so that desired sheet working is performed on the workpiece by the sheet working machine. The workpiece which was worked by the sheet working machine is carried out to the workpiece piling means by the loading/unloading means so that the worked workpiece is piled thereon.

Therefore, an installation space is reduced and operability at the time of off-line operation is improved.

BEST MODE FOR CARRYING OUT THE INVENTION

There will be detailed below embodiments of the present invention with reference to the drawings.

Figure 3:
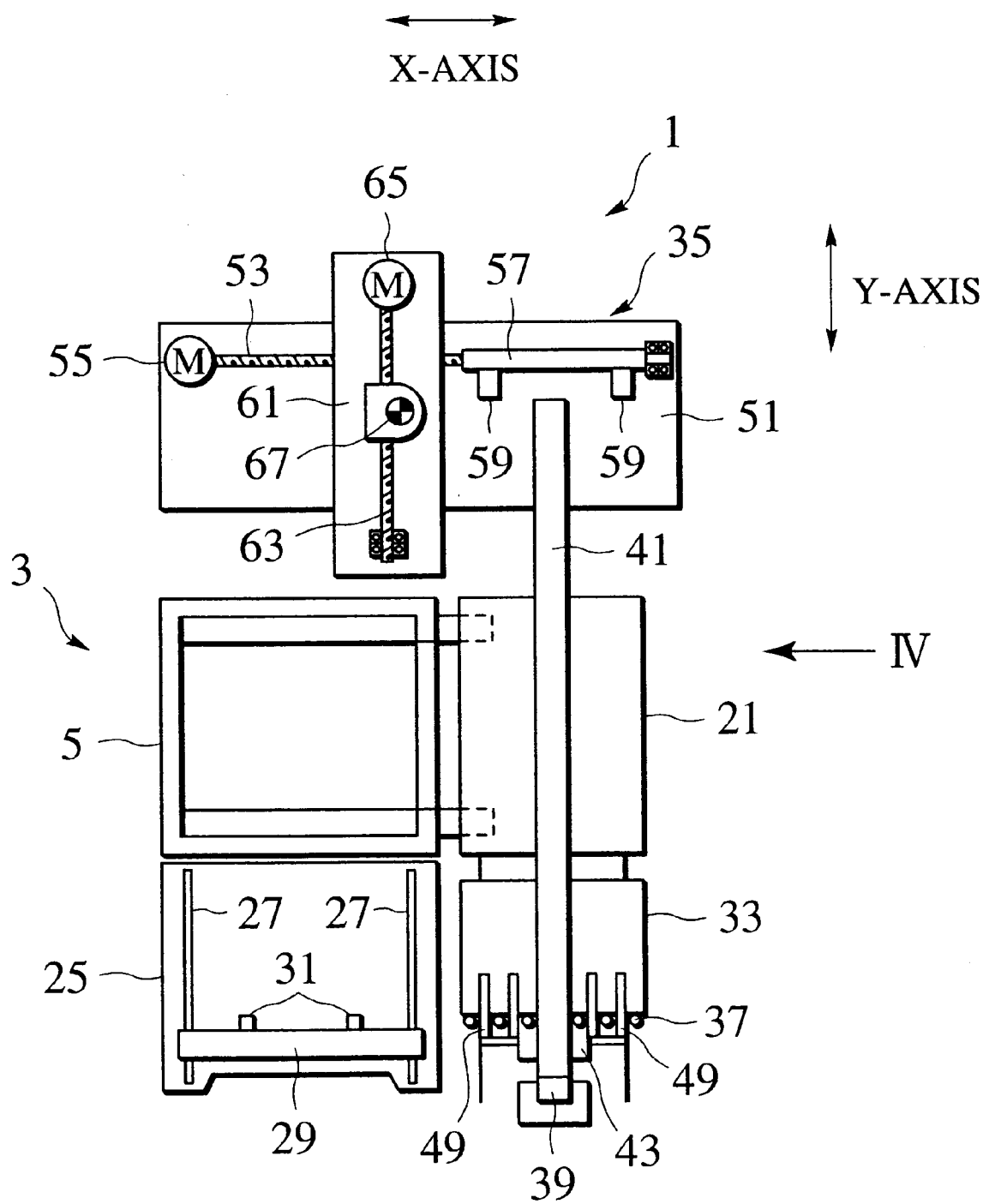
FIG. 3 is a plan view of a sheet metal working system of the present invention.
Figure 4:
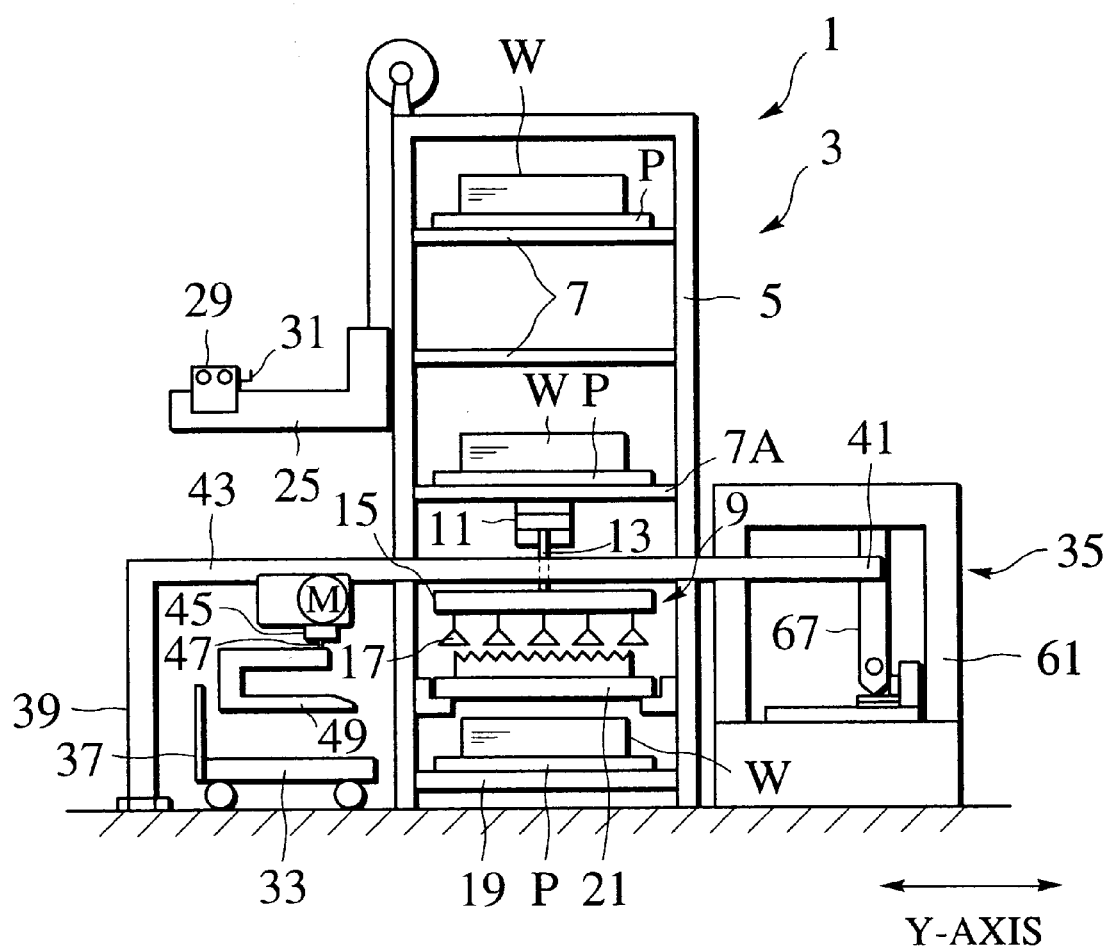
FIG. 4 is a front view of FIG. 3.
Figure 5:
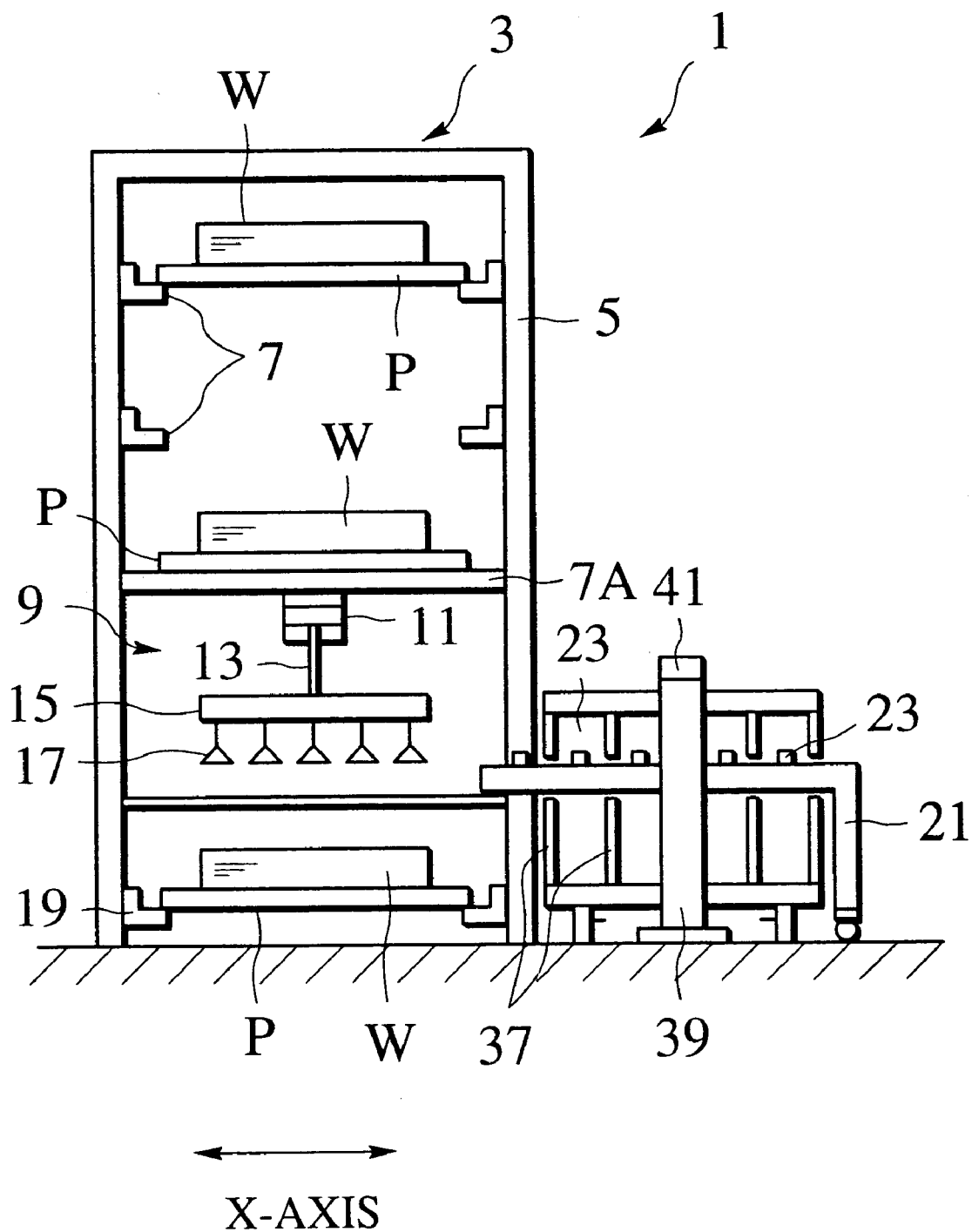
FIG. 5 is a side view of FIG. 3.

As shown in FIGS. 3, 4 and 5, a sheet metal working system 1 has a housing rack 3 which stands, and the housing rack 3 is composed of a frame 5. A plurality of shelves 7 are provided in a vertical direction of the frame 5, and a pallet P on which a plurality of workpieces W are placed is housed in each of the shelves 7.

A workpiece separator apparatus 9 is provided on the bottom shelf 7A in the housing rack 3. An up/down cylinder 11 for the workpiece separator apparatus 9 is provided on the shelf 7A. A pad-use frame 15 is mounted to a lower end of a piston rod 13 mounted to the up/down cylinder 11. A plurality of vacuum pads 17 are provided on the pad-use frame 15.

In addition, a pallet holding frame 19 as pallet holding means for temporarily holding the pallet P on which a plurality of workpieces W are placed is provided below the shelf 7A. Moreover, a table truck 21 as workpiece table means is provided so as to be adjacent to the housing rack 3, and the table truck 21 is capable of moving towards a left side in FIG. 5 to a position of the bottom shelf 7A in the housing rack 3. Supporting frames 23 for supporting the workpieces W are provided on an upper surface of the table truck 21 at suitable intervals in the horizontal direction in FIG. 5.

An elevator 25 as pallet transport means which is capable of moving up/down is provided on a side of the frame 5 in the housing rack 3 (lower side in FIG. 3, and left side in FIG. 4). Guide rails 27 which are extended in the vertical direction in FIG. 3 are provided in the elevator 25. A traverser 29, which is guided along the guide rails 27 so as to be capable of moving by itself in the vertical direction in FIG. 3 and in the horizontal direction in FIG. 5, is provided, and the traverser 29 has hooks 31 which are engaged with the pallet P.

A workpiece collecting means 33 as a workpiece piling means is provided on the side of the elevator 25 across a position (position of solid line in FIG. 5) where the table truck 21 leaves the bottom shelf 7A in the housing rack 3. A laser working machine 35, for example, as a sheet working machine (especially, as a sheet metal working machine) is provided on the side opposite to the elevator 25. A plurality of stoppers 37 are provided on a rear side (left side in FIG. 4) of the workpiece collecting means 33 at suitable intervals in the horizontal direction in FIG. 5.

A frame 39 stands on the left side in FIG. 4 of the workpiece collecting means 33, and a guide rail 41 which is extended in the horizontal direction in FIG. 4 is provided integrally with an upper portion of the frame 39. The front end of the guide rail 41 is extended to the laser working machine 35. A loader/unloader 43 as a loading/unloading means is provided to the guide rail 41, and the loader/unloader 43 is capable of moving in the horizontal direction in FIG. 4 by itself.

An up/down cylinder 45 is provided to the loader/unloader 43, and a plurality of forks 49 are provided at a lower end of the piston rod 47 mounted to the up/down cylinder 45 so as to be inserted into gaps between the plural supporting frames 23 provided on the upper surface of the table truck 21.

As clearly shown in FIG. 3, the laser working machine 35 is provided with a workpiece table 51 which is extended in the horizontal direction (X axial direction), and a ball screw 53 which is extended in the X axial direction is provided in an upper portion in FIG. 3 of the workpiece table 51. A drive motor 55 is connected with a left end of the ball screw 53. The ball screw 53 is screwed into a nut member, not shown, and a carriage 57 is provided onto the nut member. Furthermore, the carriage 57 has a plurality of workpiece clamps 59.

A gate type frame 61 is provided at a substantially center portion in the horizontal direction (X axial direction) in FIG. 3 of the workpiece table 51 cross over the workpiece table 51. The gate type frame 61 is provided with a ball screw 63 which is extended in the vertical direction (Y axial direction) in FIG. 3, and an upper side of the ball screw 63 is connected with a drive motor 65. The ball screw 63 is screwed into a nut member, not shown, and the nut member is provided with a laser working head 67.

According to the above structure, the pallet P, on which the workpieces W are placed and which is housed on the plurality of shelves 7 in the housing rack 3, is taken out so that the workpieces W are laser-worked by the laser working machine 35, and thereafter the worked workpieces are collected onto the workpiece collecting means 33. This operation will be described below.

At first, the elevator 25 is moved up/down so as to be located in a position of the necessary shelf 7. Thereafter, the traverser 25 is moved to the right side in FIG. 4 of the Y axial direction so that the hooks 31 are engaged with the pallet P. The traverser 25 in this state is moved to the left side in FIG. 4 so that the pallet P on which the workpieces W are placed is pulled out onto the elevator 25.

Next, the elevator 25 is lowered so as to be stopped in the position of the bottom shelf 7A in the housing rack 3. When the traverser 29 is moved to the right side in FIG. 4 in this state, the pallet P is temporarily held on the pallet holding frame 19 at the bottom shelf 7A. Then, the hooks 31 slip out of the pallet P so that the pallet P is returned to its original position.

The up/down cylinder 11 of the workpiece separator apparatus 9 is operated so that the vacuum pads 17 are lowered via the piston rod 13. Then, the topmost workpiece W of the plural workpieces W is absorbed so as to be raised. In the state that the workpiece W is absorbed and raised up, the table truck 21 is moved from the side position of the housing rack 3 to the position of the bottom shelf 7A. When the workpiece W is separated from the vacuum pads 17 of the workpiece separator apparatus 9 and is placed onto the supporting frames 23 of the table truck 21 in the position of the bottom shelf 7A, the table truck 21 is moved from the bottom shelf 7A to the side position (right side in FIG. 3) of the housing rack 3.

In this state the loader/unloader 43 is moved to the right side in FIG. 4 and the up/down cylinder 45 is operated so that the forks 49 are lowered via the piston rod 47. When the forks 49 are inserted into the gaps between the supporting frames 23 and the workpiece W is placed onto the fork 49, the forks 49 rise and are separated from the supporting frames 23 of the table truck 21 so that the workpiece W is transferred in a state where the workpiece W is located onto the forks 49.

The loader/unloader 43 is guided by the guide rail 41 to the right side in FIG. 4 of the Y axial direction so as to be moved, and the workpiece W on the forks 49 is transferred from the forks 49 onto the workpiece table 51 of the laser working machine 35, and the workpiece W is clamped by the workpiece clamps 59. In this state, when the drive motors 55 and 65 are driven so that the ball screws 53 and 63 are rotated, the carriage 57 is moved to the X axial direction and the laser working head 67 is moved to the Y axial direction. As a result, a desired position of the workpiece W is laser-worked by a laser beam emitted from the laser working head 67.

A second workpiece W is taken in the similar manner to the above one during the laser working and is placed onto the table truck 21 so as to be waited.

When the laser working of the workpiece W is completed, the forks 49 are put under the workpiece W on the workpiece table 51, and the workpiece W is again placed onto the forks 49 to be raised by running the loader/unloader 43 and the workpiece clamps 59 are unclamped. When the loader/unloader 43 is moved to the left side in FIG. 4, forks 49 passes through between the stoppers 37, but the workpiece W on the fork 49 bumps against the stoppers 37 so as to be stopped. When the forks 49 are left from the workpiece W, the workpiece W drops onto the workpiece collecting means 33 to be collected.

The forks 49 of the loader/unloader 43 scoop up the second workpiece W on the table truck 21 left from the bottom shelf 7A in the housing rack 3 and carries the workpiece W into the laser working machine 35, and the operation is repeated in the above manner. As a result, the laser working is executed until the pallet P runs out of the workpieces W.

In the case where the laser working is executed further after the pallet P runs out of the workpieces W, the operation for pulling the pallet P out of the shelf 7 in the housing rack 3 is started again in the above manner.

Figure 1:
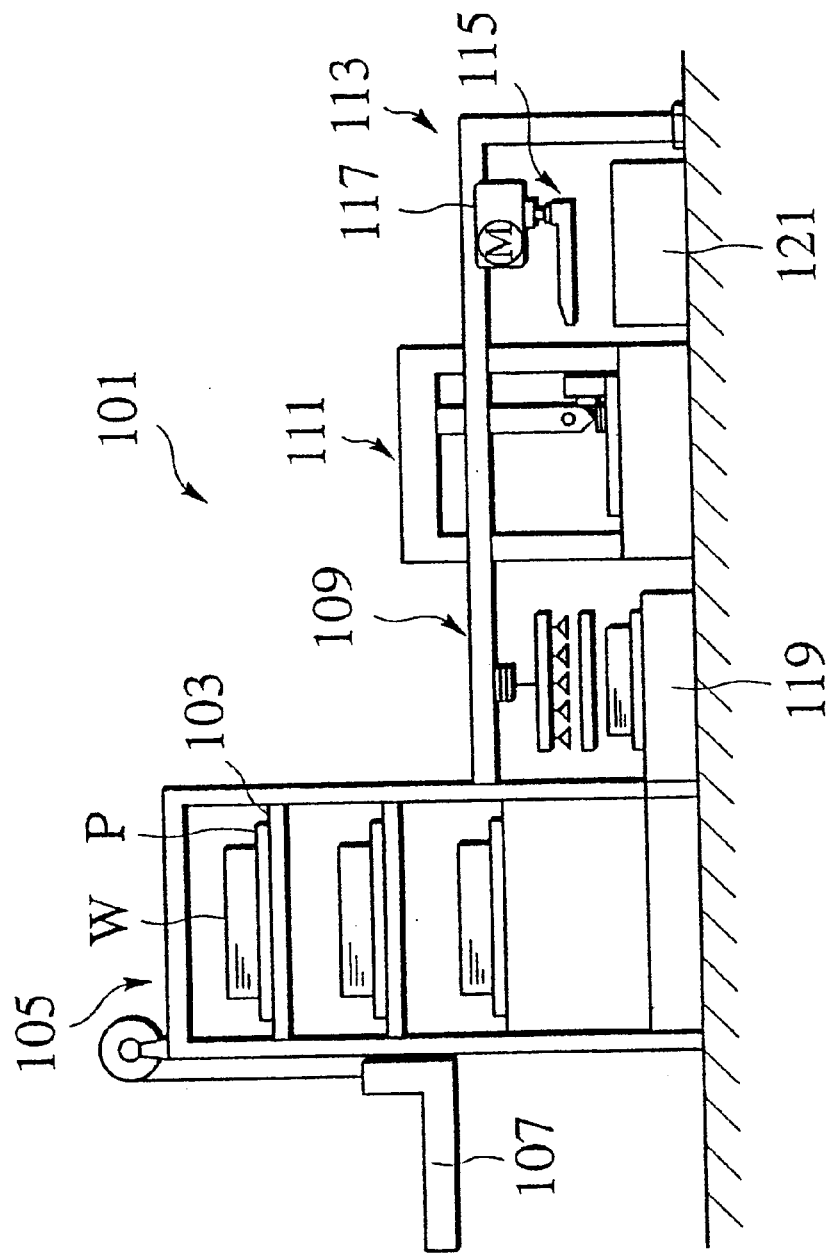
FIG. 1 is a front view of a conventional sheet metal working system.
Figure 2:
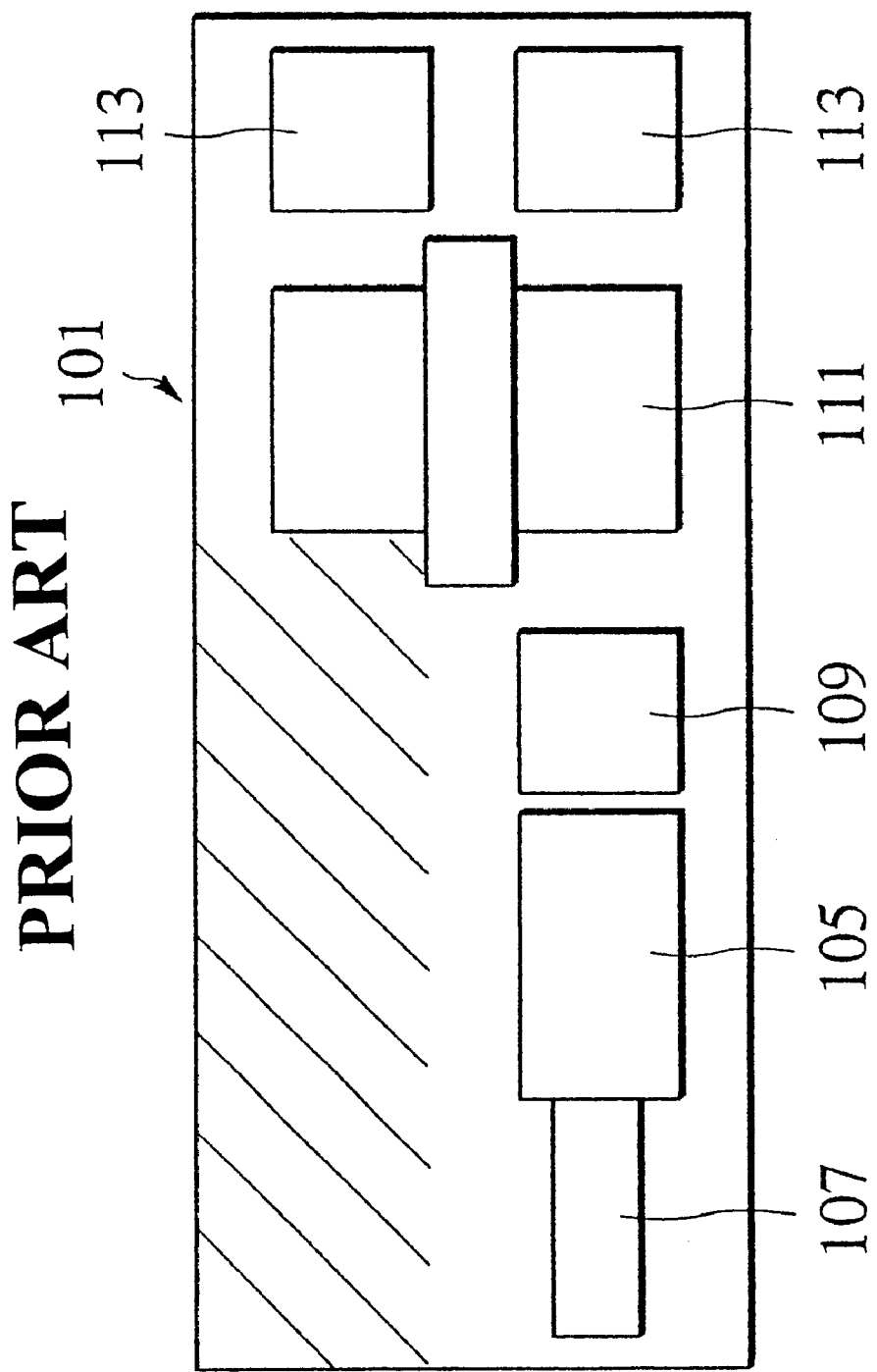
FIG. 2 is a plan view of FIG. 1.

Therefore, when the installation space in the state shown in FIG. 3 is compared with the conventional installation space shown in FIG. 2, an installation area in FIG. 3 becomes small, and thus there exists no useless space. Furthermore, one side of the laser working machine 35, that is, the upper side in FIG. 3 is a free space, and thus a space where an operator can trespass becomes larger. As a result, the operability at the time of the off-line operation, that is, the operability such as manual carrying-out of the workpieces can be improved.

Figure 6:
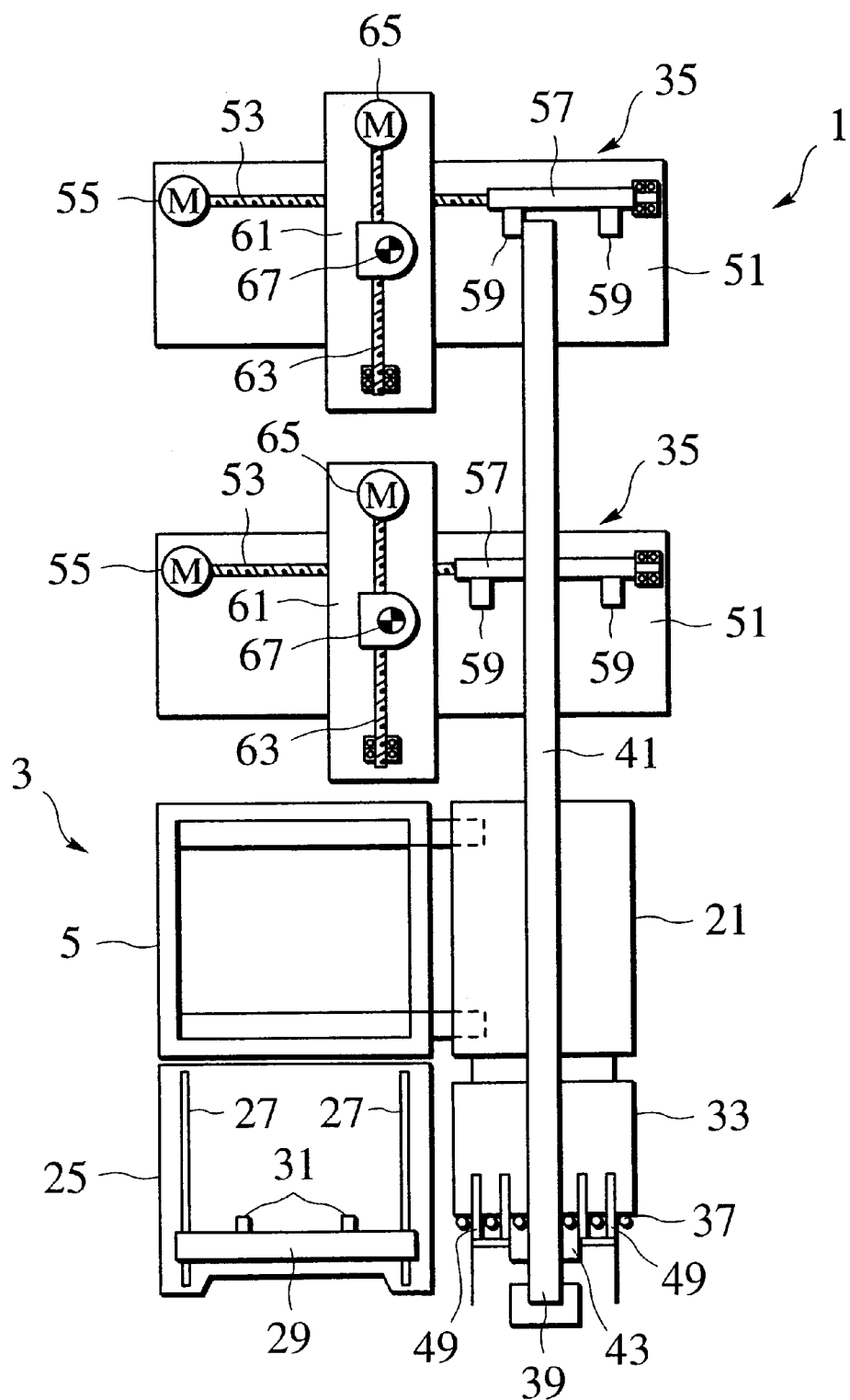
FIG. 6 is a plan view instead of FIG. 3 of another sheet metal working system according to a second embodiment of the present invention.

As a second embodiment shown in FIG. 6, even when one more laser working machine 35 is provided, that is, two laser working machines are provided, the functions and effects same as those in FIG. 3 can be produced.

Figure 7:
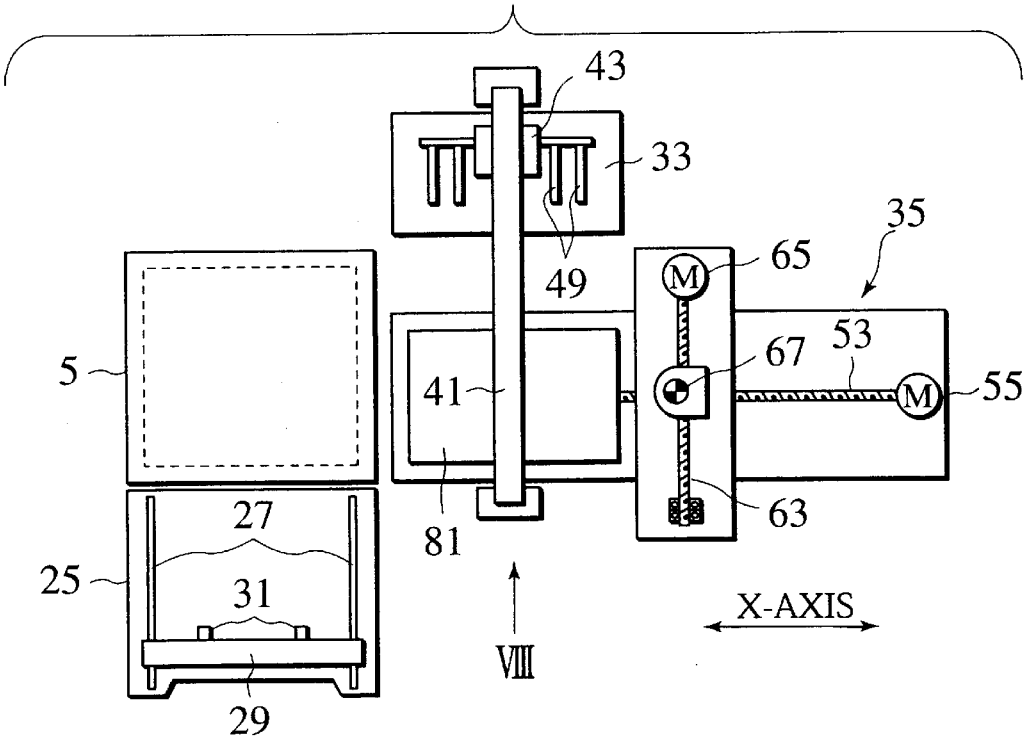
FIG. 7 is a plan view of a third embodiment of the present invention.
Figure 8:
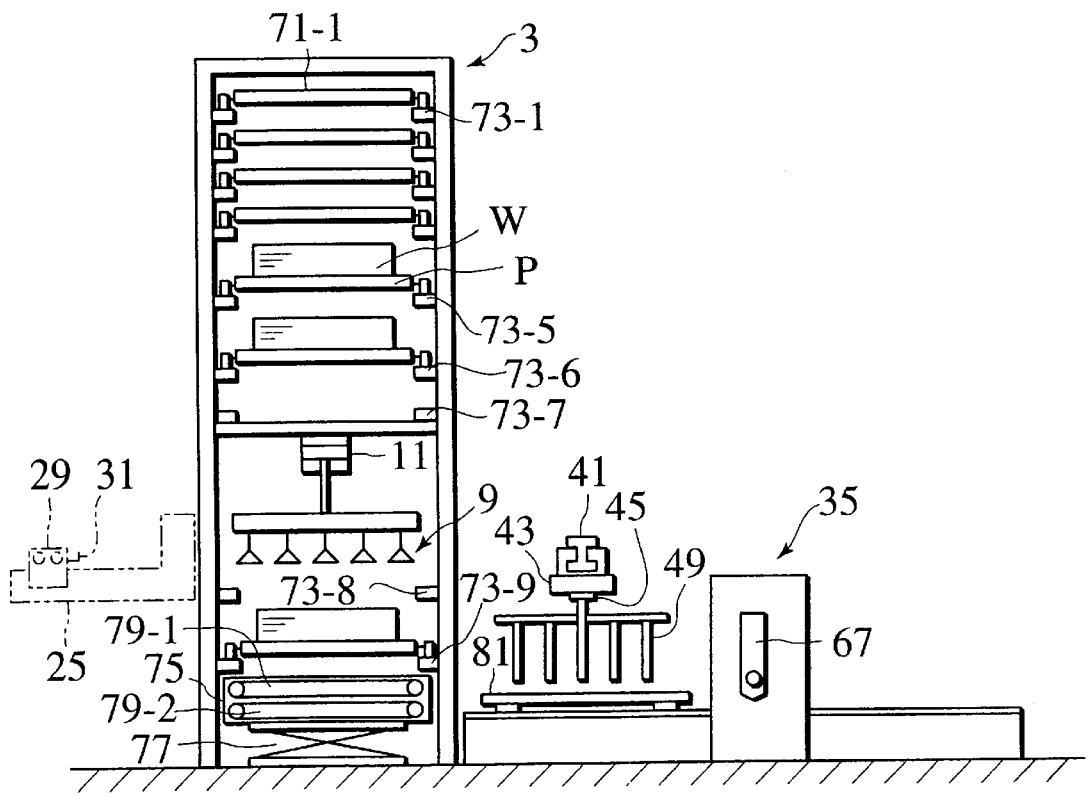
FIG. 8 is a front view of FIG. 7.

There will be described below a third embodiment of the present invention with reference to FIGS. 7 and 8.

In the third embodiments, empty pallets 71-1 to 71-4 are housed in the top through fourth shelves and pallets P on which a plurality of workpieces W are placed are housed in the fifth through seventh shelves in the housing rack 3. The workpiece separator apparatus 9 which moves up/down by means of the up/down cylinder 11 is provided on a ceiling of the eighth shelf, in the other wards, the workpiece separator apparatus 9 is provided under a pair of seventh run boards for the seventh shelf. The seventh shelf is to house an empty pallet which is to be slidingly loaded on the seventh run boards.

A pair of ninth run boards 73-9 are provided at the ninth shelf, so that a pallet P on which the workpieces W are placed and which is to be worked, is housed thereon.

A cage 75 is provided at the bottom shelf, in other wards, under the ninth shelf. The cage 75 includes an upper chain conveyor 79-1 and a lower chain conveyor 79-2. The cage 75 is capable of being moved up/down by a lifter 77. Each of the upper and the lower chain conveyors 79-1 and 79-2 are capable to be aligned with the elevator 25 and the laser working machine 35 by the up and down movement of the lifter 77.

The elevator 25 as a pallet transport means which is capable of moving up/down and which is the same as that in the first embodiment, is provided on an outer side surface of the housing rack 3. The laser working machine 35 is installed so as to be adjacent to the housing rack 3, and a table 81 of the laser working machine 35 is aligned in height with the upper and the lower chain conveyors 79-1 and 79-2 at the bottom shelf of the housing rack 3. The pallet P on which the workpieces W are placed and which is supplied from the housing rack 3, can be placed onto the table 81 by the elevator 25 and the upper and the lower chain conveyors 79-1 and 79-2.

The table 81 of the laser working machine 35 is capable of moving in the horizontal (X axial) direction in the laser working machine 35 by the drive motor 55 and the ball screw 53 mounted to a base of the laser working machine 35.

The workpiece collecting means 33 is installed so as to be adjacent to the table 81 of the laser working machine 35, and a guide rail 41 is provided across the laser working machine 35 and the workpiece collecting means 33. The unloader 43 can move along the guide rail 41 in the vertical direction in FIG. 7 by a driving means mounted therein. A plurality of forks 49 are provided to the unloader 43 via the up/down cylinder 45 so as to be capable of moving up/down. The unloader 43 scoops up the workpiece W (on the upper surfaces of the forks 49) which was worked by the laser working machine 35 from the table 81. The plurality of forks 49 support the workpiece W while the workpiece W is carried out to the workpiece collecting means 33.

There will be described below the operation according to the above structure. At first, the pallet P on which the workpieces W to be worked are placed, is moved to the ninth shelf by the elevator 25 so as to be slidingly loaded on the ninth run boards 73-9. The workpiece separator apparatus 9 is lowered from the eighth shelf to the ninth shelf by the up/down cylinder 11. The workpiece separator apparatus 9 separate and pick up and lift-up the upper-most workpiece W (hereinafter "taken workpiece W") among the workpieces W piled on the pallet P. The workpiece separator apparatus 9 is reversedly elevated up from the ninth shelf to the eighth shelf by the up/down cylinder 11, so that the upper-most workpiece W is also elevated up by the workpiece separator apparatus 9.

Then the elevator 25 moves to one of suitable empty pallets 71-1 to 71-4 on one of the first through fourth shelves, and the empty pallet P is transferred to the eighth shelf by the elevator 25 so that the empty pallet P is slidingly loaded on the eighth run boards 73-8. Then the taken workpiece W is put onto the empty pallet P in such a manner that the workpiece separator apparatus 9 is lowered from the eighth shelf to the ninth shelf by the up/down cylinder 11.

At the bottom shelf, the cage 75 is lowered by the lifter 77 so that the upper chain conveyor 79-1 in the cage 75 is aligned with the elevator 25 in their height direction. The elevator 25 puts the pallet P (on which the taken workpiece W is placed) onto the upper chain conveyor 79-1 in the cage 75 at the bottom shelf. At this time, since a previous workpiece W is being worked in the laser working machine 35, the cage 75 is raised by the lifter 77 so that the lower chain conveyor 79-2 in the cage 75 is aligned with the table of the laser working machine 35 and the elevator 25 in their height direction.

When the working of the previous workpiece W is completed in the laser working machine 35, the forks 49 of the unloader 43 comes into between a previous pallet P on the table 81 of the laser working machine 35 and the previous workpiece W on the previous pallet P. When the up/down cylinder 45 is operated so as to raise the forks 49, the previous workpiece W is lifted from the previous pallet P. In this state, the unloader 43 is moved along the guide rail 41 to the workpiece collecting means 33, and the worked workpiece W is collected and piled onto the workpiece collecting means 33.

Meanwhile, the previous empty pallet P on the table 81 of the laser working machine 35 is returned to the lower chain conveyor 79-2 in the cage 75 by the circulation of chain loops. Then the previous empty pallet P is further returned to a suitable empty shelf at one of the first through fourth shelves of the housing rack 3 by the elevator 25.

Thereafter, when the pallet P which waits on the upper chain conveyor 79-1 of the cage 75 and on which the workpiece W to be nextly worked was placed, is lowered by the lifter 77 so as to be aligned with the table 81 of the laser working machine 35. The pallet P is carried onto the table 81 of the laser working machine 35 by the upper chain conveyor 79-1, and the workpiece W is started to be laser-worked.

Here, the operations described in the first and the third embodiments are suitable for the case where the workpiece W is comparatively thin and time required for working one workpiece is comparatively short and the carrying-in/out of the workpiece is frequent. However, in the case where the workpiece W is thick and it is difficult to take single workpiece W from the pallet by the workpiece separator apparatus 9 or in the case where a special workpiece W is used, in the structure of the second embodiment, an empty pallet P is lowered by the elevator 25 to the bottom shelf and the workpiece W can be placed onto the empty pallet P by an operator. In order that the pallet P on which the workpiece W was placed is carried into the laser working machine 35 immediately, the pallet P may be waited in the cage at the bottom shelf of the housing rack 3, or it may be temporarily housed on one of the upper shelves of the housing rack 3.

There will be described below a fourth embodiment of the present invention with reference to FIGS. 9 and 10.

Figure 9:
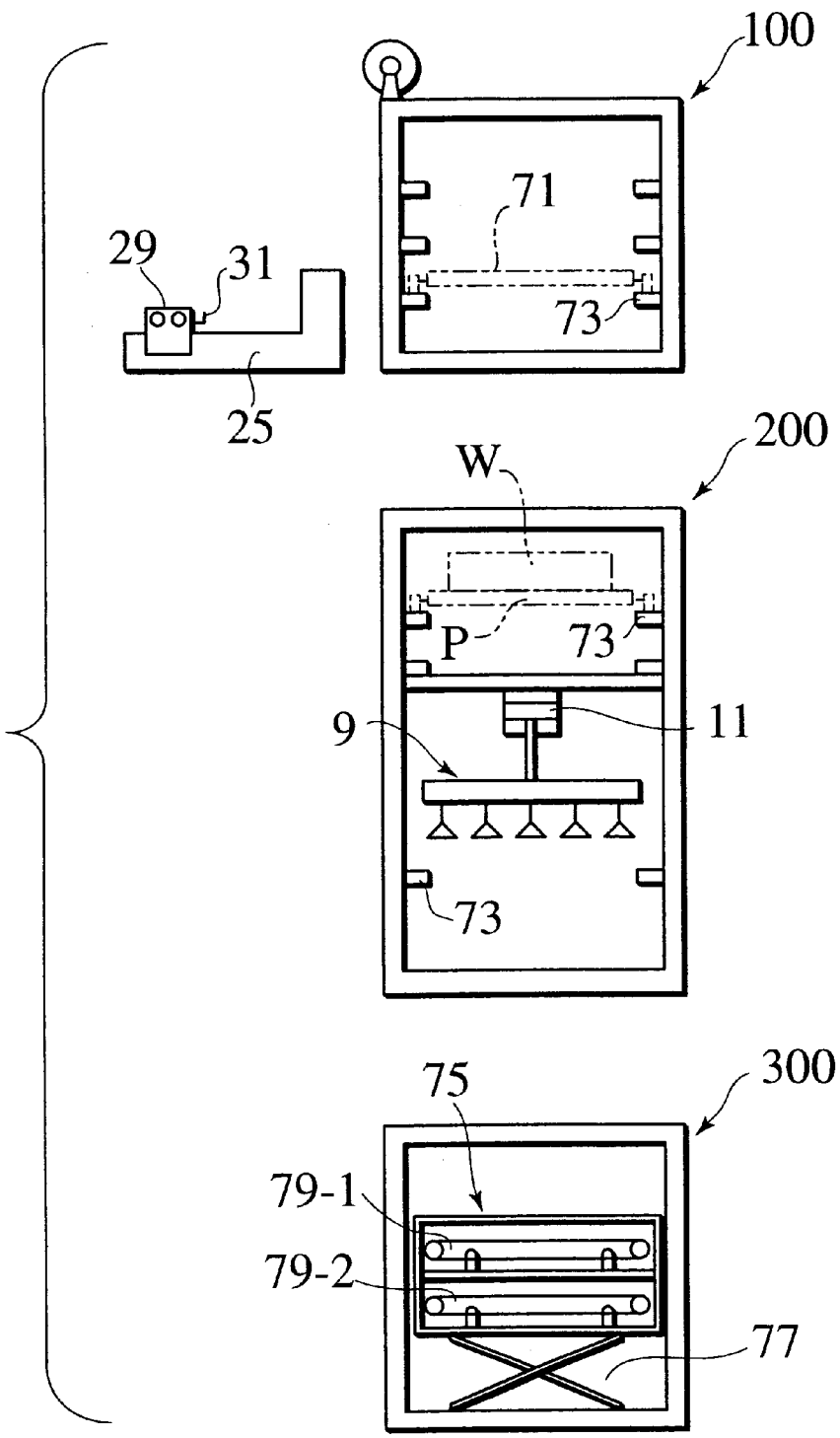
FIG. 9 is a front view of a fourth embodiment of the present invention.

In the fourth embodiment, the housing rack 3 is constructed by a first unit 100, a second unit 200, a third unit 300 and the elevator 25 including the traverser 29 and the hooks 31 as same as in the first embodiment as shown in FIG. 9. The first unit 100 includes a plurality of run boards 73-1, 73-2, 73-3, . . . and a plurality of empty pallets 71-1, 71-2, 71-3, . . . as same as in the third embodiment as shown in FIG. 9. The first unit 100 is to be loaded with empty pallet P or a pallet P on which a single workpiece W is placed.

The second unit 200 includes a plurality of run boards and a plurality of pallets P on which a plurality of workpieces W are piled as same as in the third embodiment as shown in FIG. 9. The pallets P are used to be piled with a plurality of workpiece W which are to be worked and used to be piled with a plurality of workpiece W which are finished to be worked. The second unit 200 further includes a workpiece separator apparatus 9 which moves up/down by means of the up/down cylinder 11 on a ceiling of an appropriate shelf of the second unit 200 as same as in the third embodiment as shown in FIG. 9.

The unit 300 includes a cage 75 which is provided with an upper chain conveyor 79-1 and a lower chain conveyor 79-2 as same as in the third embodiment as shown in FIG. 9. The cage 75 is capable of being moved up/down by a lifter 77. Each of the upper and the lower chain conveyors 79-1 and 79-2 are capable to be aligned with the elevator 25 and the laser working machine 35 shown in FIG. 8 by the up and down movement of the lifter 77.

In the construction stated above, since each units are able to be divide, transportability of the housing rack is improved.

Figure 10:
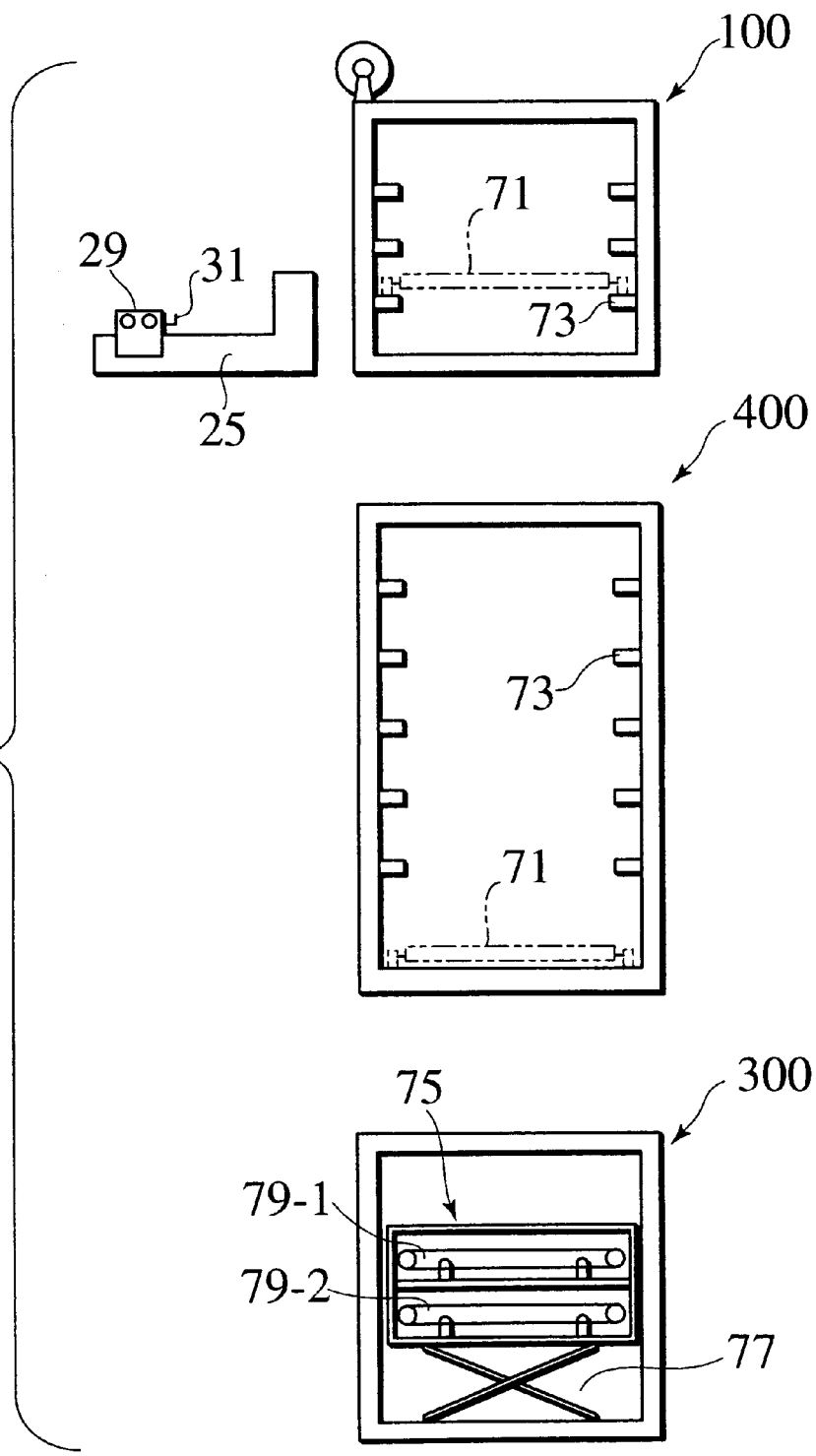
FIG. 10 is a front view of a partial improvement of the fourth embodiment of the present invention.

As an improvement of the fourth embodiment, the second unit 200 is able to be replaced by a fourth unit 400 shown in FIG. 10. The fourth unit 400 includes a plurality of run boards and a plurality of empty pallets as same as the first unit 100 shown in FIG. 9.

The above improved housing rack 3 is applicable for the manufacturing where thick workpieces, workpieces to be worked with special working and workpieces to be worked with long time working are almost occupied in manufacturing lots.

In addition to the above, according to the construction of the improved housing rack 3, each heights of each shelves of the first and the fourth unit 100 and 400 is able to increased in design. In this case, the first and the fourth unit 100 and 400 are applicable to be loaded with pallets P on which a plurality of workpieces W are piled. Therefore, the housing rack 3 in this case is applicable for the manufacturing where workpieces are worked with short time in a manufacturing large lots.

While preferred embodiments of the present invention have been described using specific terms, such description is for illustrative purposes, and it is to be understood that changes and variations may be made without departing from the spirit or scope of the following claims.

What is claimed is:

1. A sheet working system, comprising:
    a housing rack provided with a plurality of shelves in its vertical direction for housing pallets on which workpieces are placed;
    a pallet transport means provided on a side of the housing rack, the pallet transport means being capable of moving up/down, the pallet transport means having a traverser for putting the pallets into/out of the housing rack;
    a pallet holding means located on a bottom shelf of the housing rack, the pallet holding means temporarily holding a pallet transported by the pallet transport means;
    a workpiece separator means located above the pallet holding means, the workpiece separator means taking a single workpiece;
    a workpiece table means located adjacently to the housing rack, the workpiece table means being capable of moving, the workpiece table means temporarily placing the single workpiece taken by the workpiece separator means;
    a sheet working machine and a workpiece piling means arranged so as to sandwich the workpiece table means; and
    a loading/unloading means being capable of moving among the workpiece table means, the sheet working machine and the workpiece piling means.

2. The sheet working system according to claim 1, wherein said workpiece separator means is further located within said housing rack.

3. The sheet working system according to claim 1, wherein said workpiece table means is configured to reciprocally slide at least in an X-axis direction into and out of said housing rack.

4. The sheet working system according to claim 1, wherein said sheet working machine and said workpiece piler are positioned on opposite sides of said workpiece table.

5. A sheet working system, comprising:
   a housing rack provided with a plurality of shelves in its vertical direction for housing pallets;
   a pallet transport means provided on a side of the housing rack, the pallet transport means being capable of moving up/down, the pallet transport means having a transverser for putting the pallets into/out of the housing rack;
   a workpiece separator means located below a middle shelf in a substantially vertical direction of said housing rack, the workpiece separator means taking a single workpiece;
   an empty pallet located in one of the shelves, the empty pallet temporarily holding the single workpiece taken by the workpiece separator means;
   a sheet working machine having a table; and
   a loading means loading the pallet from the pallet transport means to the table of the sheet working machine.

6. The sheet working system according to claim 5, wherein said loading means is a conveyor belt.

7. A sheet working system according to claim 5, further comprising:
   an unloading means unloading the pallet from the table of the sheet working machine to the pallet transport means.

8. A sheet working system according to claim 7, further comprising:
   a workpiece piling means piling a workpiece which is finished to be worked by the sheet working machine; and
   another unloading means unloading the worked workpiece from the table of the sheet working machine in such a manner that the pallet is left on the table of the sheet working machine so as to be separated from the worked workpiece.

9. The sheet working system according to claim 8, wherein said another unloading means is a conveyor belt.

10. A sheet working system comprising:
    a housing rack having a plurality of shelves in a vertical direction and configured for housing pallets upon which workpieces are placed;
    a pallet transporter provided on a side of said housing rack, and configured to reciprocally move in a substantially vertical direction, said pallet transporter having a transverser configured to place the pallets into and out of said housing rack;
    a pallet holder located on a bottom shelf of said housing rack, said pallet holder configured to temporarily hold a pallet transported by said pallet transporter;
    a workpiece separator located above said pallet holder, and configured to accept a single workpiece;
    a workpiece table located adjacent said housing rack and configured to move, said workpiece table configured to temporarily place the single workpiece taken by said workpiece separator;
    a sheet working machine and a workpiece piler positioned so as to sandwich said workpiece table therebetween; and
    a loader/unloader configured to move among said workpiece table, said sheet working machine and said workpiece piler.

11. The sheet working system according to claim 10, wherein said workpiece separator is further located within said housing rack.

12. The sheet working system according to claim 10, wherein said workpiece table is configured to reciprocally slide at least in an X-axis direction into and out of said housing rack.

13. The sheet working system according to claim 10, wherein said sheet working machine and said workpiece piler are positioned on opposite sides of said workpiece table.

14. A sheet working system comprising:
    a housing rack having a plurality of shelves arranged in a substantially vertical direction and configured to hold pallets;
    a pallet transporter provided on a side of said housing rack and configured to reciprocally move in the substantially vertical direction, said pallet transporter having a transverser for placing the pallets into and out of said housing rack;
    a workpiece separator located below a middle shelf of said plurality of shelves and in the substantially vertical direction of said housing rack, said workpiece separator configured to accept a single workpiece;
    an empty pallet located in one shelf of said plurality of shelves, the empty pallet configured to temporarily hold the single workpiece accepted by said workpiece separator;
    a sheet working machine having a table; and
    a loader configured to load the pallet from said pallet transporter to said table of said sheet working machine.

15. The sheet working system according to claim 14, wherein said loader is a conveyor belt.

16. The sheet working system according to claim 14, further comprising:
    an unloader configured to unload the pallet from said table of said sheet working machine to said pallet transporter.

17. The sheet working system according to claim 16, further comprising:
    a workpiece piler configured to pile a workpiece that is worked by said sheet working machine; and
    another unloader configured to unload the worked workpiece from said table of said sheet working machine such that the pallet remains on said table of said sheet working machine so as to be separated from the worked workpiece.

18. The sheet working system according to claim 16, wherein said another unloader is a conveyor belt.

* * * * *